United States Patent
Laamanen et al.

(12)

(10) Patent No.: US 9,276,452 B2
(45) Date of Patent: Mar. 1, 2016

(54) METHOD FOR MANUFACTURING WINDING COIL FOR AN ELECTRICAL MACHINE

(75) Inventors: Antti Laamanen, Helsinki (FI); Jari Jäppinen, Helsinki (FI); Juhani Mantere, Helsinki (FI); Pekka Ketola, Helsinki (FI)

(73) Assignee: ABB TECHNOLOGY AG, Zurich (CH)

( * ) Notice: Subject to any disclaimer, the term of this patent is extended or adjusted under 35 U.S.C. 154(b) by 513 days.

(21) Appl. No.: 13/516,451

(22) PCT Filed: Dec. 15, 2010

(86) PCT No.: PCT/FI2010/051038
§ 371 (c)(1),
(2), (4) Date: Sep. 4, 2012

(87) PCT Pub. No.: WO2011/073523
PCT Pub. Date: Jun. 23, 2011

(65) Prior Publication Data
US 2012/0319524 A1    Dec. 20, 2012

(30) Foreign Application Priority Data

Dec. 15, 2009  (FI) ..................................... 20096333

(51) Int. Cl.
*H02K 1/00*     (2006.01)
*H02K 15/04*    (2006.01)

(52) U.S. Cl.
CPC .................................. *H02K 15/045* (2013.01)

(58) Field of Classification Search
CPC .................................................. H02K 15/045
USPC ........................................ 310/201, 208, 194
See application file for complete search history.

(56) References Cited

U.S. PATENT DOCUMENTS

| 3,868,766 A | 3/1975 | Gramlich et al. |
| 4,816,710 A | 3/1989 | Silvaggio et al. |
| 4,818,909 A * | 4/1989 | Balke ............................ 310/208 |

(Continued)

FOREIGN PATENT DOCUMENTS

| DE | 41 26 019 A1 | 2/1992 |
| EP | 1 852 958 A2 | 7/2007 |

(Continued)

OTHER PUBLICATIONS

International Search Report (PCT/ISA/210) issued on Mar. 29, 2011, by the Finnish Patent Office as the International Searching Authority for International Application No. PCT/FI2010/051038.

(Continued)

*Primary Examiner* — Thanh Lam
(74) *Attorney, Agent, or Firm* — Buchanan Ingersoll & Rooney PC

(57) ABSTRACT

A method is disclosed for manufacturing the winding coil of an electrical machine from flat wire. The coil can include coil sides fitted to a groove of an electrical machine and end sections which are left outside the groove and form a coil end. Flat wire can be used for winding a spool in which the coil rounds are in the same winding plane and in which there are two parallel straight coil sides on opposite sides. After this, the parallel straight coil sides can be bent towards each other essentially to the right angle in comparison to the winding plane.

12 Claims, 4 Drawing Sheets

(56) References Cited

U.S. PATENT DOCUMENTS

Figures 1, 3:
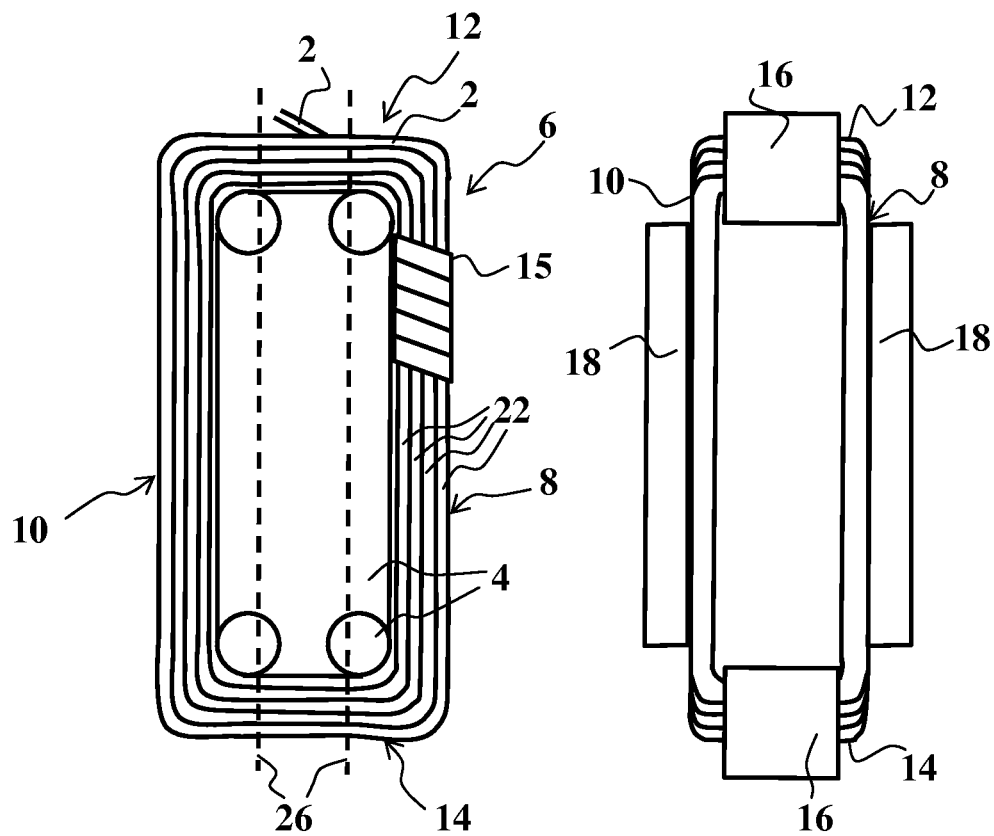

| | | | | |
|---|---|---|---|---|
| 4,975,611 | A | * | 12/1990 | Rochester .................... 310/194 |
| 5,623,174 | A | * | 4/1997 | Markovitz et al. ............. 310/45 |
| 5,866,965 | A | | 2/1999 | Baronosky et al. |
| 5,986,374 | A | | 11/1999 | Kawakami |
| 6,011,339 | A | | 1/2000 | Kawakami |
| 6,555,942 | B1 | * | 4/2003 | Hsu ............................... 310/208 |
| 6,870,292 | B2 | * | 3/2005 | Owada et al. ................. 310/194 |
| 2002/0079775 | A1 | * | 6/2002 | Janssen et al. ................ 310/208 |
| 2003/0098630 | A1 | | 5/2003 | Owada et al. |
| 2005/0110357 | A1 | * | 5/2005 | Fukasaku et al. ............. 310/179 |
| 2007/0145852 | A1 | * | 6/2007 | Schon et al. .................. 310/180 |
| 2008/0010812 | A1 | | 1/2008 | Clark |

FOREIGN PATENT DOCUMENTS

| | | |
|---|---|---|
| JP | 62-260548 A | 11/1987 |
| JP | 11-069687 A | 3/1999 |
| JP | 2004-015878 A | 1/2004 |
| JP | 2006-109562 A | 4/2006 |

OTHER PUBLICATIONS

The extended European Search Report issued on Apr. 22, 2013, by the European Patent Office in corresponding European Patent Application No. 10837111.3-1809 (6 pgs).

* cited by examiner

METHOD FOR MANUFACTURING WINDING COIL FOR AN ELECTRICAL MACHINE

The object of the invention is a method for manufacturing a winding coil for an electrical machine according to the preamble of Claim 1.

A winding for an electrical machine is made first as a spool, if the size, manufacturing technology or insulation requirement of the winding so require. After this, the spool is formed so that it can be fitted to the grooves of an electrical machine. The manufacturing of winding comprises several main phases. The winding conductors covered with conductor insulation are wound to a spool defined by the dimensioning. The spool is bent to the shape required by the type and dimensioning of the electrical machine, the parts to be located in the grooves of the electrical machine, and the coil ends are insulated. A ready winding coil is fitted to the electrical machine, supported, fastened and insulated where applicable.

The aim is to automate and mechanize the manufacturing of a winding for an electrical machine as far as possible. However, in several cases the manufacture comprises work phases which must be performed manually. This may be caused by the machine's structure, the type of winding or other individual characteristics. Automation may also lead to complex solutions, in which case the benefit from it is questionable.

One winding type is concentric winding in which the winding's coil sides in the grooves of an electrical machine are relatively close to each other. In the coil ends, bent the winding several times on a short distance to make it possible to install successive windings in their places without increasing the length of coil end unreasonably. The distance between parallel coil sides is small and, therefore, it is difficult to wind the insulation around the coil side.

A method for manufacturing a concentric winding for an electrical machine is described in the publication US 2008/0010812. According to it, the winding coil is manufactured by using a support bar which is turned in each bending phase, and the winding conductor is bent in each bending phase with the help of shaping tools.

The objective of the invention is to develop a method for manufacturing a concentric winding of an electrical machine to be able to solve the problems described above. In order to achieve this, the method according to the invention is characterized by the features specified in Claim 1. Certain preferred embodiments of the invention are characterized by the features listed in the dependent claims.

Figure 2:
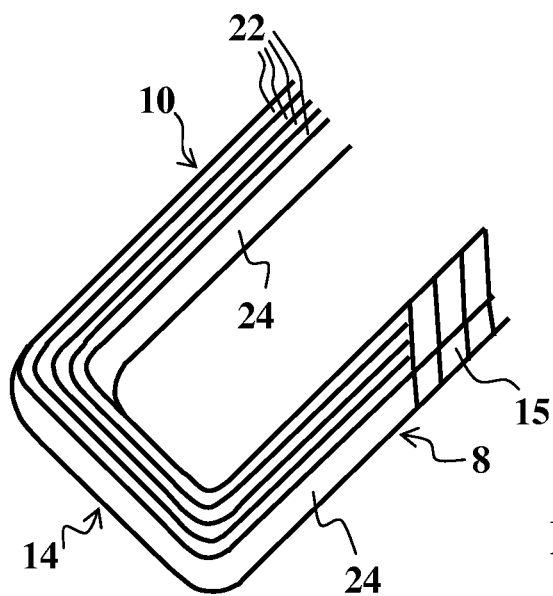
Figure 4:
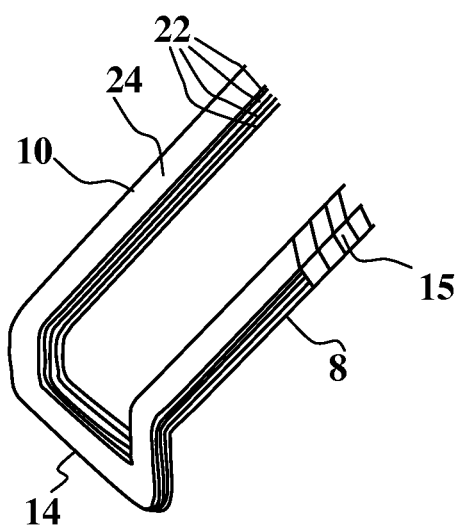
Figure 5:
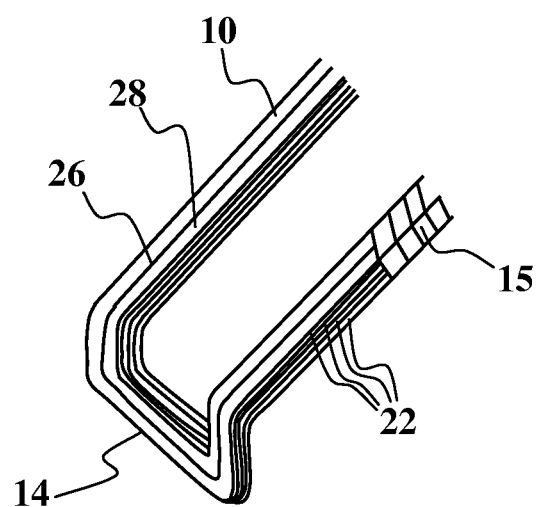
Figure 6:
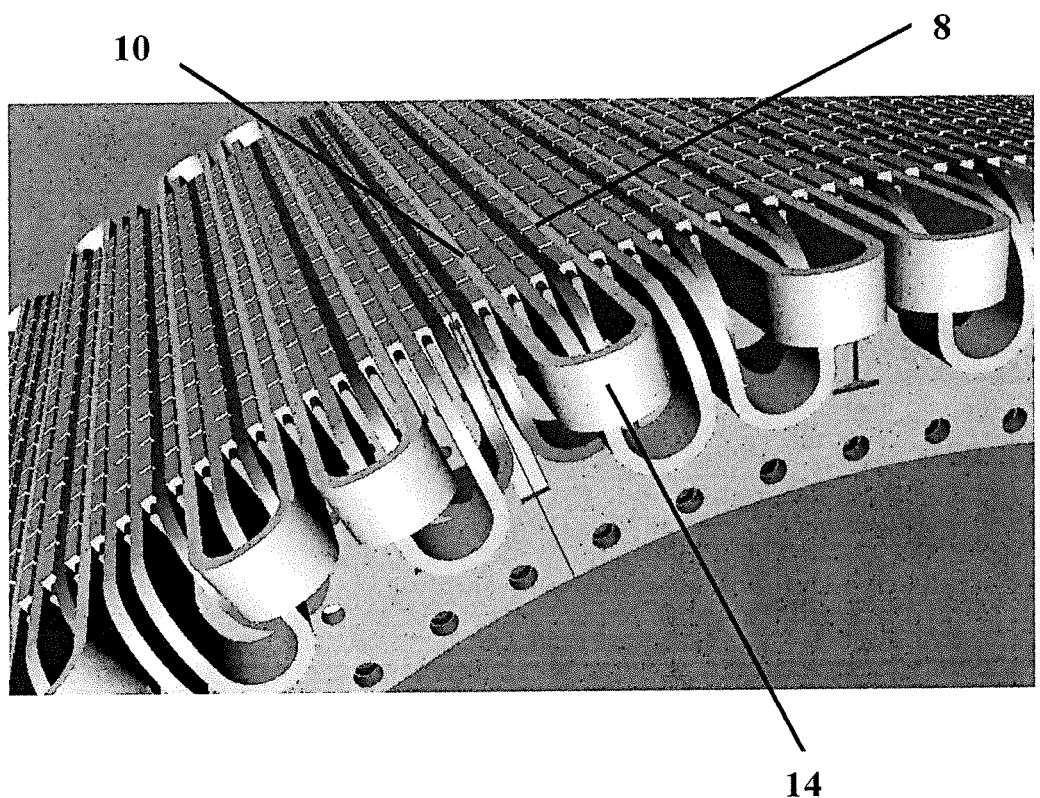

In the following the invention will be described with the help of certain embodiments by referring to the enclosed drawings, where:

FIG. 1 illustrates the first manufacturing phase of spool viewed from above, FIG. 2 illustrates the end section of spool during the first manufacturing phase in perspective, FIG. 3 illustrates the second manufacturing phase of spool viewed from above, FIG. 4 illustrates the end section of spool during the second manufacturing phase in perspective, FIG. 5 illustrates the end section of spool during the second manufacturing phase in perspective, when the coil comprises two parallel conductors, and FIG. 6 illustrates winding coils fitted to groves of the electrical machine.

FIG. 1 illustrates the first phase of a method according to the invention, when the spool 6 is viewed from above. In FIG. 2, the other end of the spool according to FIG. 1 is illustrated in perspective. The conductor 2, formed of flat wire, is wound around the winding device 4 as many times as there are conductors on top of each other in a ready coil when the coil has been placed in the groove of an electrical machine. The flat wire 2 is bent over its longer edge in both ends of coil sides, in which case the narrower side 22 of the flat wire is on the top and bottom surface of the spool. This creates a so-called racetrack spool in which there are the same number of rounds in parallel as there are rounds on top of each other in the groove of a ready machine. As seen in FIG. 6, the length of the spool sides 8 and 10 in the spool 6 is the same as the length of the groove in the electrical machine. The end sections 12 and 14, left between the coil sides 8 and 10, are as long as the coil section left out of the grooves, i.e. the coil end with all its bends. After the spool 6 is wound, it is insulated by winding, for example, tape-like insulator 15 around the spool 6. The dotted lines 26 illustrate the points from which the spool is bent in the second part of the manufacturing. The distance of parallel dotted lines essentially corresponds to the distance between the coil sides of a ready coil, i.e. the distance between the electrical machine's grooves in which the coil will be installed.

In the second phase, the spool will be bent so that the coil ends 12 and 14 are kept, at least in their middle part, essentially in the same winding plane with the spool. The coil sides are bent throughout the length of the coil side, essentially to the angle of 90 degrees in relation to the winding plane. The coil ends are supported with a support beam 16 and the coil sides are bent around the support beam with the bending device 18. FIG. 3 illustrates the spool from above after the second phase, when in the method presented in FIG. 2 the wider face 24 of the flat wire 2 is the topmost face in the location of the coil sides 8 and 10, and the narrower face 22 of the flat wire is the topmost face in the location of the middle part of coil ends 12 and 14. Correspondingly, FIG. 4 illustrates the other end of the spool in perspective.

The precise bending angle of coil sides is determined by the angle between the grooves of the electrical machine. Preferably, the spool is supported at the coil ends so that the coil end will be formed to the final coil end shape with one bending work phase. This will form the spool end's straight sides which are in the same winding plane as the spool, both in the bent parts of the coil end formed from the bending sections of the spool winding and the bending sections formed during the bending of the spool.

The coils of an electrical machine have different lengths based on their location and position in relation to the frame of the electrical machine and other coils. The length of parts between the coil sides is determined on that basis. However, the length of coil sides is determined by the length of the electrical machine's groove. When manufacturing the coils of one machine, it is possible to use the same template to define the length of the coil sides, but the template must be changed for the coil ends or its supporting points must be relocated.

FIG. 5 illustrates an embodiment of the invention, in which the winding is manufactured from two parallel conductors 26 and 28, which are parallel in a ready coil in the groove of an electrical machine. The spool has two flat wires in parallel so that the second narrow side of the first wire is against the first narrow side of the second wire. In the second phase of manufacturing, the wires are in parallel in the coil side sections.

The arrangement and method according to the invention is also advantageous especially for very narrow coils because it is possible to wind the tape-like insulator in the spool phase, as with a regular overlapping two-layer coil. In the Figures, the tape insulator 15 is wound around the spool in some part of coil side. It is preferable to wind the tape insulator before bending the spool, while the distance between the coil sides is long.

The invention claimed is:

1. Method for manufacturing a winding coil for an electrical machine from flat wire, which coil includes coil sides fitted to a groove of the electrical machine and end sections which are left outside the groove and form a coil end, the method comprising:
    winding a spool with flat wire, wherein coil rounds are in a same winding plane with two parallel straight coil sides on opposite sides;
    winding the spool so that the flat wire is bent around its wider face, in which case wider faces of the flat wire will lay against each other when the wires are on top of each other in the spool; and
    bending the parallel straight coil sides towards each other essentially at a right angle in comparison to the winding plane.

2. A method according to claim 1, comprising:
    supporting the spool parts between the coil sides so that at least their central parts remain in the winding plane.

3. A method according to claim 1, comprising:
    supporting the spool parts between the coil sides so that bends in spools can be made essentially with a distance of the grooves in the electrical machine.

4. A method according to claim 1, wherein the parallel straight coil sides in the spool have a distance which corresponds to a distance of ready coil sides added with a depth of the groove in the electrical machine and a height of the coil end in a radial direction of the machine.

5. A method according to claim 1, comprising:
    winding two flat cables in parallel, the two flat cables being bent to an angle in comparison to the winding plane, such that the winding coil will have two parallel conductors.

6. A method according to claim 1, comprising:
    winding a tape-like insulator over the spool.

7. An electrical machine comprising:
    grooves of the electrical machine; and
    coils fitted to the grooves, at least one of the coils having end sections located outside the groove to form a coil end, at least one coil being a flat wire wound on a spool with coil rounds in a same winding plane with two parallel straight coil sides on opposite sides, the parallel straight coil sides being bent towards each other essentially at a right angle relative to the winding plane,
    wherein the spool is wound with the flat wire bent around its wider face, such that wider faces of the flat wire will lay against each other when the wires are on top of each other in the spool.

8. An electrical machine according to claim 7, wherein the spool comprises:
    spool parts supported between the coil sides so that at least their central parts remain in the winding plane.

9. An electrical machine according to claim 7, wherein the spool comprises:
    spool parts supported between the coil sides so that bends in spools can be made essentially with a distance of the grooves in the electrical machine.

10. An electrical machine according to claim 7, wherein the spool comprises:
    spool parts supported between the coil sides so that wherein the parallel straight coil sides in the spool have a distance which corresponds to a distance of ready coil sides added with a depth of the groove in the electrical machine and a height of the coil end in a radial direction of the machine.

11. An electrical machine according to claim 7, comprising:
    two flat cables wound in parallel, the two flat cables being bent to an angle in comparison to the winding plane, such that the winding coil will have two parallel conductors.

12. An electrical machine according to claim 7, comprising:
    a tape-like insulator wound over the spool.

* * * * *